(12) United States Patent
Schmidt et al.

(10) Patent No.: US 7,434,459 B2
(45) Date of Patent: Oct. 14, 2008

(54) CONTEXT ACQUISITION BASED ON LOAD SENSING

(75) Inventors: Albrecht Schmidt, Crailsheim (DE);
Martin Strohbach, Lancaster (GB);
Kristof Van Laerhoven, Essen (BE);
Adrian Friday, Lancaster (GB);
Hans-W. Gellersen, Lancaster (GB);
Uwe Kubach, Waldbronn (DE)

(73) Assignee: SAP Aktiengesellschaft, Walldorf (DE)

( * ) Notice: Subject to any disclaimer, the term of this patent is extended or adjusted under 35 U.S.C. 154(b) by 1123 days.

(21) Appl. No.: 10/670,781

(22) Filed: Sep. 26, 2003

(65) Prior Publication Data

US 2004/0148089 A1   Jul. 29, 2004

Related U.S. Application Data

(60) Provisional application No. 60/414,331, filed on Sep. 30, 2002.

(51) Int. Cl.
*A61B 5/00* (2006.01)
*G01L 1/00* (2006.01)
*G01L 13/00* (2006.01)
*G01L 15/00* (2006.01)
*G01G 7/00* (2006.01)
*G01G 9/00* (2006.01)
*G08B 21/00* (2006.01)

(52) U.S. Cl. ............... 73/172; 73/862.042; 73/862.046; 702/139; 702/173; 700/301; 700/302; 700/305; 340/666

(58) Field of Classification Search ............ 700/56, 700/57, 58, 60, 61, 62, 64, 65, 258, 301, 700/302, 305; 702/47, 92, 93, 104, 188, 702/128, 129, 138, 139, 173; 73/1.15, 745, 73/754, 706, 715, 777, 172, 862.325, 862.042, 73/862.045, 862.046; 340/426.24, 856.3, 340/995.28, 540, 665–667; 324/207.11, 324/207.12, 207.13
See application file for complete search history.

(56) References Cited

U.S. PATENT DOCUMENTS 3,657,475 A    4/1972    Peronneau et al.

(Continued)

FOREIGN PATENT DOCUMENTS

DE    197 50 940 A1    5/1998

(Continued)

*Primary Examiner*—Crystal J. Bullock
(74) *Attorney, Agent, or Firm*—Fish & Richardson P.C.

(57) ABSTRACT

Methods and systems are described for sensing force information at a plurality of points on a continuous surface, and detecting contextual information about an object on the surface based on the distribution of force on the surface. For example, a plurality of sensors may be included below different points on such a substantially continuous surface, where the sensors are operable to sense force information. Then, a processor connected to the sensors may determine a location of the object relative to the surface, based on the force information from the sensors.

14 Claims, 12 Drawing Sheets

U.S. PATENT DOCUMENTS

| | | | |
|---|---|---|---|
| 4,389,711 A | | 6/1983 | Hotta et al. |
| 4,511,760 A | | 4/1985 | Garwin et al. |
| 4,526,043 A | * | 7/1985 | Boie et al. ............ 73/862.046 |
| 4,598,717 A | | 7/1986 | Pedotti |
| 4,695,963 A | * | 9/1987 | Sagisawa et al. ............ 700/258 |
| 5,054,323 A | * | 10/1991 | Hubbard et al. ............... 73/754 |
| 5,476,103 A | * | 12/1995 | Nahsner ..................... 600/595 |
| 5,993,400 A | * | 11/1999 | Rincoe et al. ............... 600/595 |
| 6,002,994 A | * | 12/1999 | Lane et al. .................. 702/188 |
| 6,033,432 A | * | 3/2000 | Augustine et al. ............ 607/96 |
| 6,109,177 A | * | 8/2000 | Wech et al. ............. 101/349.1 |
| 6,347,290 B1 | | 2/2002 | Bartlett |
| 6,958,451 B2 | * | 10/2005 | Breed et al. ..................... 177/1 |
| 7,077,009 B2 | * | 7/2006 | Lokhorst et al. .............. 73/745 |
| 2007/0050271 A1 | * | 3/2007 | Ufford et al. .................. 705/28 |

FOREIGN PATENT DOCUMENTS

| | | | |
|---|---|---|---|
| GB | 1 528 581 | | 10/1978 |
| GB | 2 125 971 | | 3/1984 |
| GB | 2 316 177 | | 2/1998 |
| GB | 2 321 707 | | 8/1998 |
| JP | 6271828 A | * | 4/1987 |

* cited by examiner

CONTEXT ACQUISITION BASED ON LOAD SENSING

CROSS-REFERENCE TO RELATED APPLICATIONS

This application claims priority from U.S. Provisional Application Ser. No. 60/414,331, filed on Sep. 30, 2002, and titled CONTEXT ACQUISITION BASED ON LOAD SENSING.

TECHNICAL FIELD

This description relates to context acquisition based on load sensing.

BACKGROUND

Load sensing includes measuring the force or pressure applied to a surface. It is widely used to measure the weight of goods, to monitor the strain on structures, and to gauge filling levels of containers.

Load sensing has also been used, to a limited degree, to capture contextual information, such as identity and location of people and objects, and the detection of activity. For example, segmented surfaces composed of load-sensitive tiles have been used to identify and track people. Similarly, a grid of piezoelectric wires under a carpet has been used to track the movement of people in artistic performances. It is also possible to perform object identification by temporarily linking a virtual object with a physical item placed on a load sensitive surface which has embedded high precision scales. The link is maintained by reference to the weight of the physical item.

A common approach to capturing contextual information is through the use of location sensing. For example, computer vision has been used to identify the location of people, and to detect their activity. This location information may then be provided as contextual information to another information processing system.

SUMMARY

According to one general aspect, force information is sensed at a plurality of points on a substantially continuous surface, the force information related to an object on the surface. A distribution of force exerted by the object, relative to the surface, is calculated based on the force information, and a location of the object on the surface is determined, based on the distribution of force.

Implementations may have one or more of the following features. For example, in computing the center of force, a total force applied to the surface by the object may be computed, and a center of force of the object on the surface may be computed. In this case, a first component of the center of force may be determined by computing a first quotient of a first sum and a total force applied to the surface by the object, the first sum obtained by summing a first force applied at a first point and a second force applied at a second point, and a second component of the center of pressure, perpendicular to the first component, may be determined by computing a second quotient of a second sum and the total force, the second sum being obtained by summing the first force applied at the first point and a third force applied at a third point.

Also, the first and second components of the center of force of the object may be computed at a first period of time, the first and second components of the center of force of the object may be computed at a second period of time, and a new location of the object on the surface may be detected, based on a change in the first and second components from the first period to the second period.

A variation in the force information may be sensed, and a change in the location of the object, relative to the surface, may be detected based on the variation in the force information. The force information may be sensed at a later period of time, and a second location of a second object on the surface may be detected, based on the force information. In this case, in computing the center of force, a first component of the center of force may be determined by computing a first quotient of a first sum and a total force applied to the surface by the object, the first sum obtained by summing a first force applied at a first point and a second force applied at a second point, and a second component of the center of pressure, perpendicular to the first component, may be determined by computing a second quotient of a second sum and the total force, the second sum being obtained by summing the first force applied at the first point and a third force applied at a third point.

Also, the object may be identified as a person, and a position of the person may be tracked. The second object may be identified as a possession of the person, an absence of the person on the surface may be detected, and the person may be alerted that the second object has been left behind. The first and second objects may be identified as people, and a center of activity of the people may be tracked.

In sensing force information, a voltage level at a plurality of load cells may be measured, each of the load cells corresponding to each of the plurality of points. In this case, the force applied by the surface to the load cells may be compensated.

According to another general aspect, a system includes a plurality of sensors below different points on a substantially continuous surface, the sensors operable to sense force information, and a processor connected to the sensors and operable to determine contextual information about a first object on the surface, based on the force information.

Implementations may have one or more of the following features. For example, a location determination module operable to determine a center of force of the object may be included. In this case, the location determination module may be operable to determine a change in a first location of the object relative to the surface. Also, the location determination module may be operable to determine a second location of a second object.

An interaction characterizer module for characterizing an interaction of the object with the surface may be included, where the interaction characterizer identifies a change in the number of objects on the surface. Also, a visualizer that is operable to generate visual representations of the force information may be included.

The sensors may include four load sensors in a rectangular configuration. The surface may include a table or a shelf, and a personal computer may be connected to the processor.

A second plurality of sensors may be included below different points on a second surface, a second processor connected to the second plurality of sensors, and a personal computer connected to the processor and second processor.

According to another general aspect, sampling force information is sampled at points on a continuous surface during a plurality of time intervals, and an interaction is identified between an object and the surface based on the sampled information.

Implementations may have one or more of the following features. For example, an average force on the surface during each of the time intervals may be computed. A variability in the force on the surface may be computed during each of the time intervals.

A first average weight during a starting interval may be compared to a second average weight during an ending interval, a first variability during the starting interval may be determined to meet or exceed a variability threshold value, a second variability during the ending interval may be compared to a third variability during an intermediate interval, between the starting and ending intervals, and a change in a number of objects on the surface may be identified, based on the first and second average weights, and the first second, and third variabilities. In this case, a difference between the first average weight and the second average weight may be compared to an average weight threshold. It may be determined that a difference between the first and second average weights meets or exceeds an average weight threshold and that the third variability meets or exceeds a variability threshold value, so that the third variability may be compared to the first and second variabilities, and a change in object position may be identified.

The details of one or more implementations are set forth in the accompanying drawings and the description below. Other features will be apparent from the description and drawings, and from the claims.

DETAILED DESCRIPTION

Figure 1:
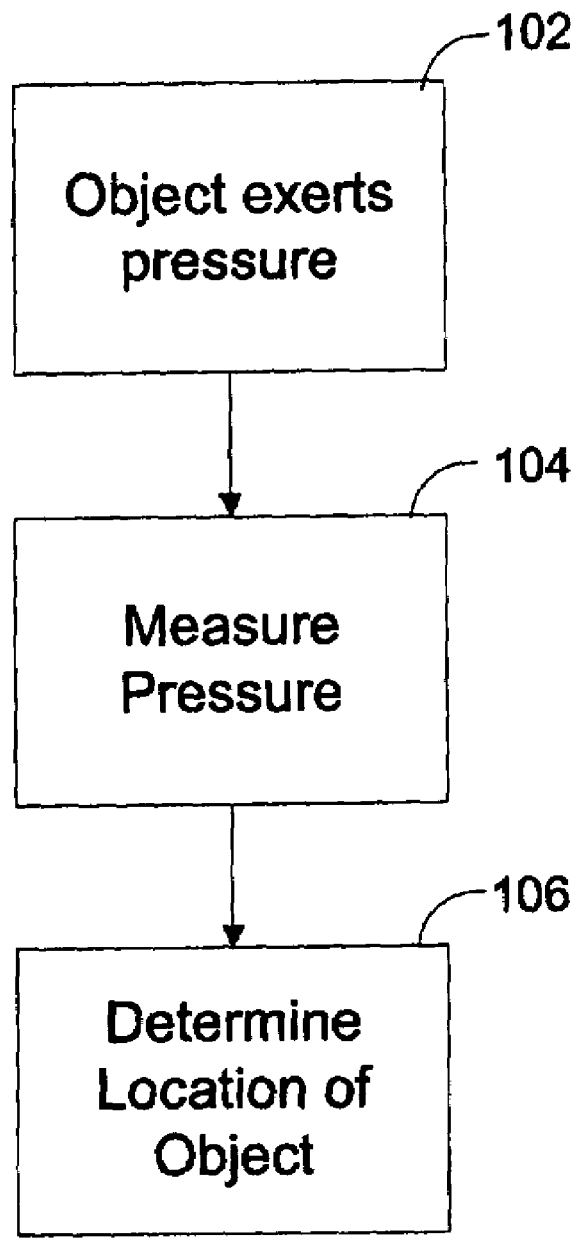
FIG. 1 is a flow chart illustrating techniques for determining object location.

FIG. 1 is a flowchart illustrating an overview of techniques for determining a location of an object on a single continuous surface. The object exerts a force or pressure on the surface (102). The pressure may be measured, using one or more of various types of sensors, at a plurality of points on the surface (104). The location of the object may then be determined based on the pressure information sensed by the sensors (106).

Figure 2:
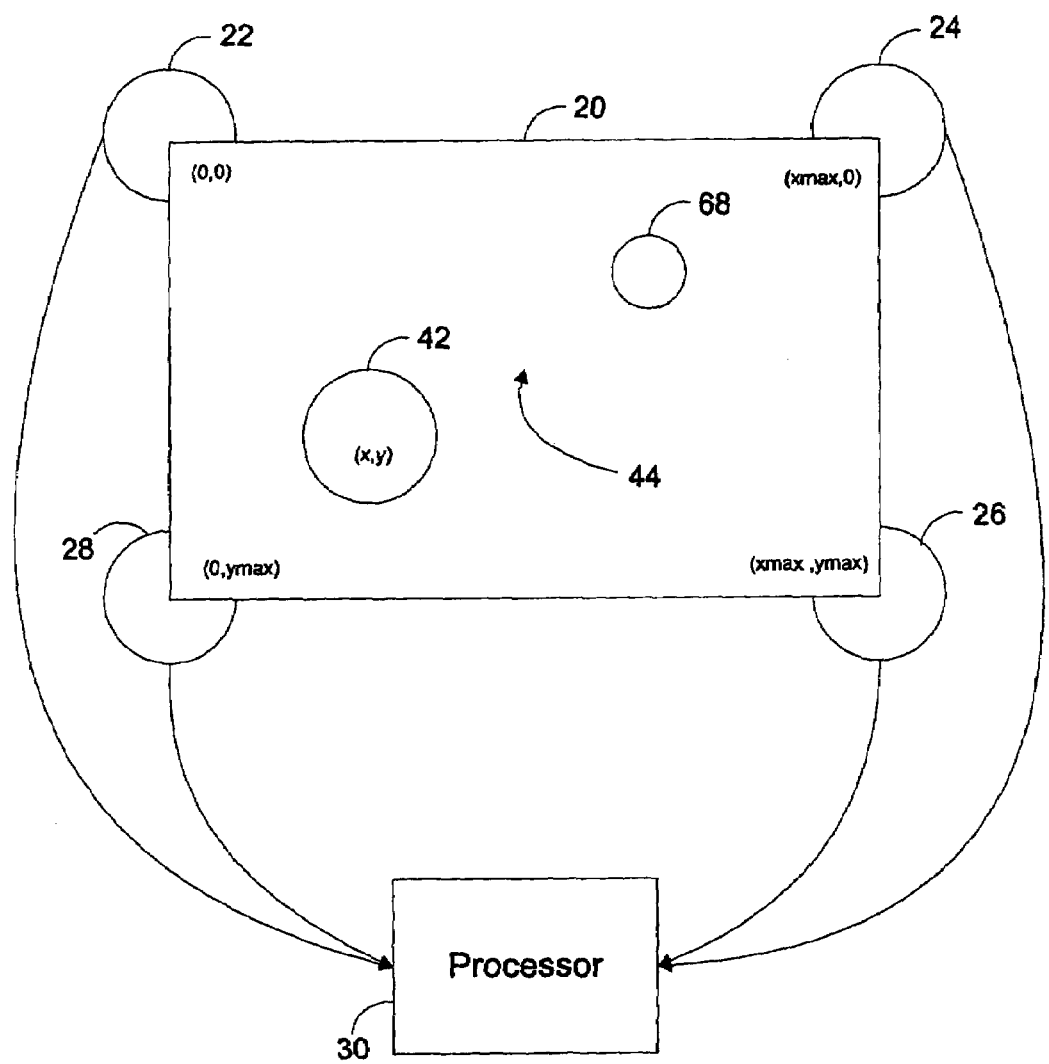
FIG. 2 is a diagram of a load sensing surface.

FIG. 2 shows a rectangular surface 20 having four load sensors 22, 24, 26, 28 which sense the force or pressure exerted on them by one or more objects placed on the surface 20, in accordance with the techniques of FIG. 1 (102, 104). The load sensors 22, 24, 26, 28 are placed at, or beneath, the four corners of the rectangular surface 20. Each load sensor generates a pressure signal indicating the amount of pressure exerted on it.

The pressure signals may be sent to a processor 30, such as a microcontroller or a personal computer, which analyzes the signals. The surface 20 may be, for example, a table top, and the sensors 22, 24, 26, 28 may be, for example, industrial load sensors, such as may detect forces up to 500N. In the example of FIG. 2, each sensor is operable to emit a voltage signal that is linearly dependant on the amount of force applied to it.

Together, the sensors 22, 24, 26, 28 measure the distribution of force on the surface 20. In FIG. 2, an object 42 is shown placed on the surface 20. If the object is placed in a center 44 of the surface 20, the pressure at each of the corners of the surface will be the same. The sensors will then sense equal pressures at each of the corners. If, as FIG. 2 shows, the object 42 is located away from the center 44, closer to some corners than others, the pressure on the surface will be distributed unequally among the corners and the sensors will sense different pressures. For example, in FIG. 2, the object 42 is located closer to an edge of the surface including sensors 22 and 28 than to an edge including sensors 24 and 26. Likewise, the object is located closer to an edge including sensors 26 and 28 than to an edge including sensors 22 and 24. The processor 30 may thus evaluate the pressures at each of the sensors 22, 24, 26, 28 to determine the location of the object 42.

Figure 11:
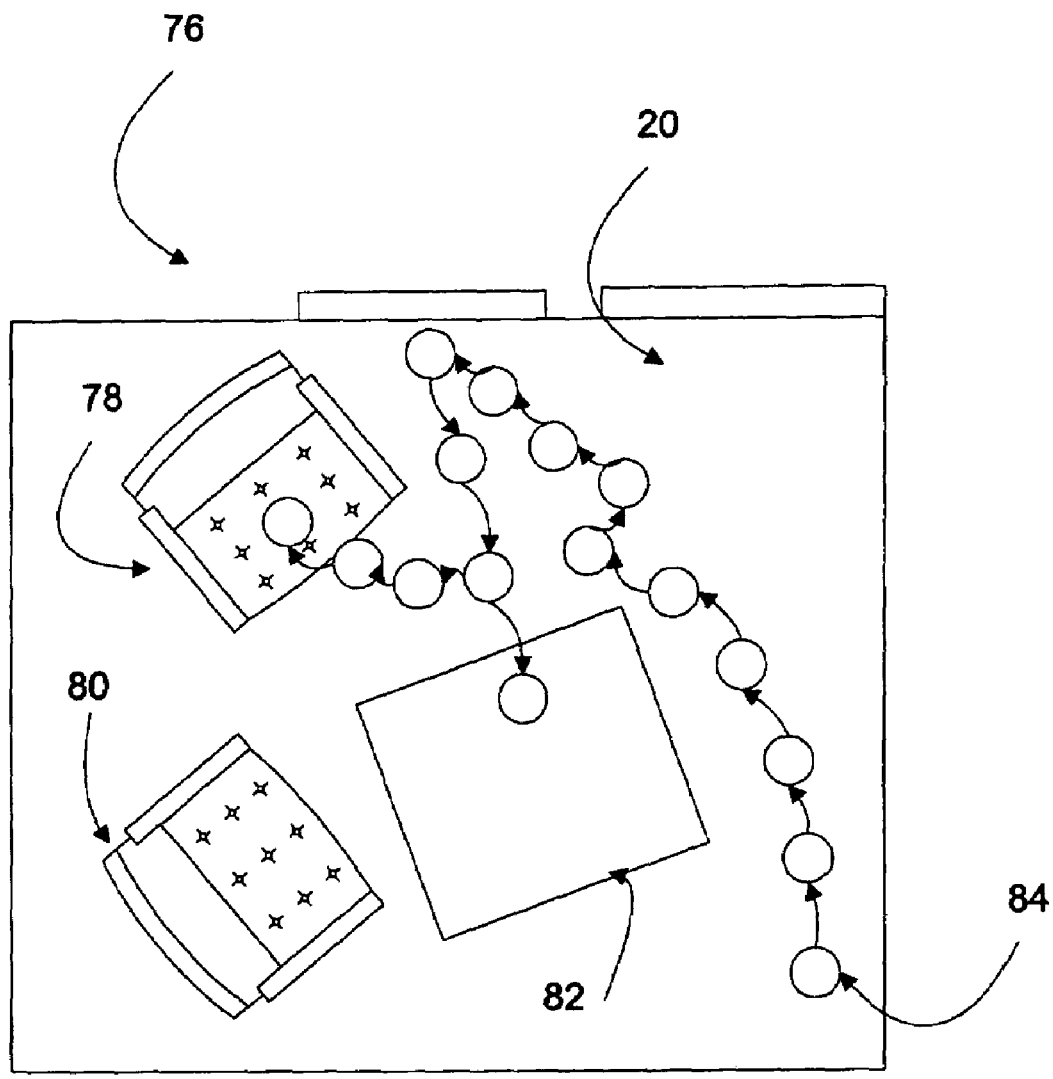
FIG. 11 is a diagram of a room with load sensing surfaces.

Techniques associated with FIG. 2, as discussed in more detail below, may be used in many different scenarios. For example, as shown in FIG. 11, the surface 20 may represent a floor in a room, and the object 42 may represent a person moving about on the floor. In this way, movements of the person may be tracked relative to other persons and items in the room. As also discussed with respect to FIG. 11, the surface 20 also may represent a table or shelf on which various items, such as computers and books, may be set. In this way, such items may be tracked for, for example, security purposes. Additionally, as discussed with respect to FIG. 12, multiple sets of the surface, sensors, and processors may be tracked at once, so as to analyze interactions between people and objects and the various surfaces.

Figure 3:
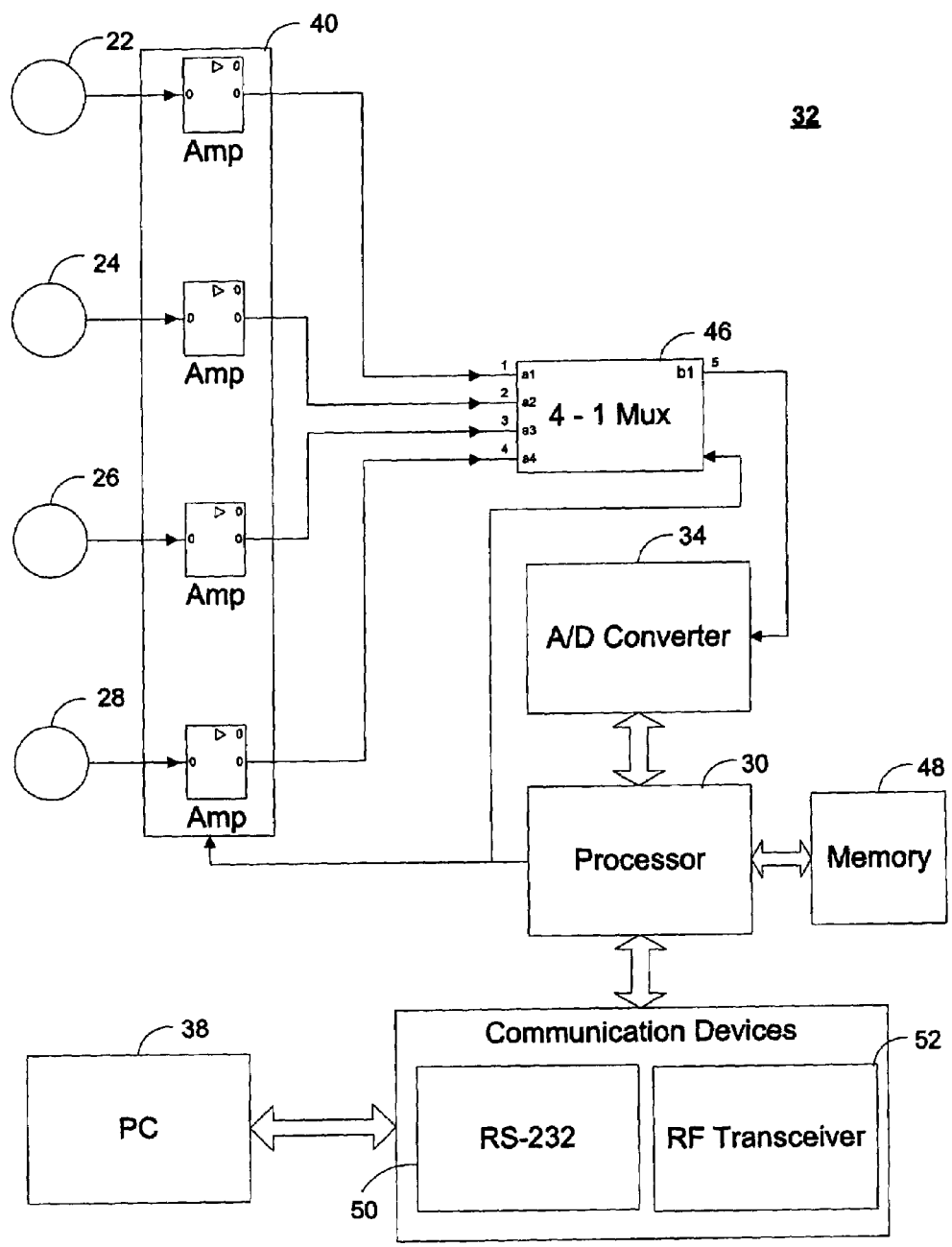
FIG. 3 is a block diagram of a system for sensing position and interaction information.

FIG. 3 shows a system 32 for sensing position and interaction information, with respect to objects on the surface 20. Each sensor 22, 24, 26, 28 outputs an analog signal that is converted to a digital signal by, for example a standard 16-bit analog to digital converter (ADC) 34. The ADC 34 links to a serial line of a personal computer (PC) 38. In one implementation, the sensors 22, 24, 26, 28 are powered with 10V, and emit signals ranging from 0 to 40 mV. The signals may be amplified by amplifiers 40 to, for example 0 to 2.5V, before being sampled by the ADC 34. The ADC 34 may be configured to sample at a low sampling frequency, for example 4 times per second. Thus, in the example of FIG. 3, each sensor 22, 24, 26, 28 senses the force applied to it and generates a voltage signal that is proportional to that force, whereupon each signal is amplified by a discrete amplifier forming part of block 40 and sampled by the ADC 34, and the sampled signal is communicated to the processor 30 for processing.

In FIG. 3, the industrial load cells 22, 24, 26, 28 used to sense position and interaction information may use resistive technology, such as a wheat stone bridge that provides a maximum output signal of 20 mV at a driving voltage of 5V. The signals may be amplified by a factor of 220, to an output range of 0 to 4.4V, using LM324 amplifiers 40. Alternatively, instrumentation amplifiers, such as an INA118 from Analog Devices may be used. Each amplified signal may be converted into a 10-bit sample at 250 Hz by the ADC 34, which may be included in the processor 30. Alternatively, the ADC 34 may be a higher resolution external 16-bit ADC, such as the ADS8320. A multiplexer 46 may be used to interface several sensors 22, 24, 26, 28 with a single ADC 34. The processor 30 may identify the location of objects, or detect events, and send location and event information to the PC 38. A memory 48, such as a FM24C64 FRAM chip from Ramtron, may be used to store history information.

The location and event information may be sent using serial communication technology, such as, for example, RS-232 technology 50, or wireless technology, such as a RF transceiver 52. The RF transceiver 52 may be a Radiometrix BIM2 that offers data rates of up to 64 kbits/s. The information may be transmitted at lower rates as well, for example 19,200 bits/s. The RF transceiver 52 may, alternately, use Bluetooth technology. The event information may be sent as data packets.

Figure 4:
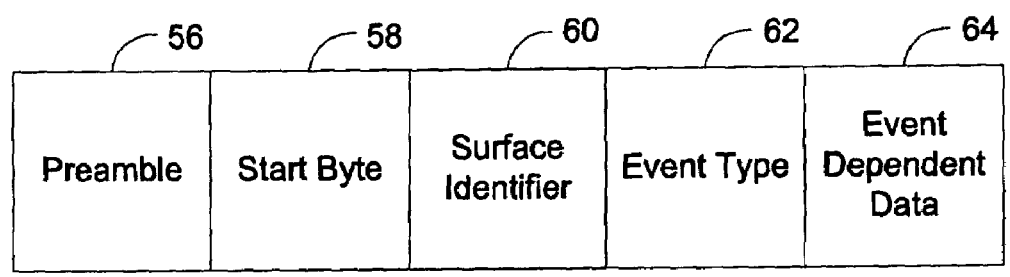
FIG. 4 is a block diagram of a data packet.

Specifically, FIG. 4 shows a data packet 54, which includes a preamble 56, a start-byte 58, a surface identifier 60, a type of event identified 62, and other event-dependent data 64. The surface identifier 60 indicates the identity of the surface on which the event information was generated, from among multiple surfaces being tracked.

The processor 30 may be configured with parameters such as the size of the surface, a sampling rate, and the surface identifier 60. The PC 38 may send the configuration information to the processor 30 using, for example, the serial communication device 50 or 52. The configuration information may be stored in a processor memory associated with the processor 30.

Figure 5:
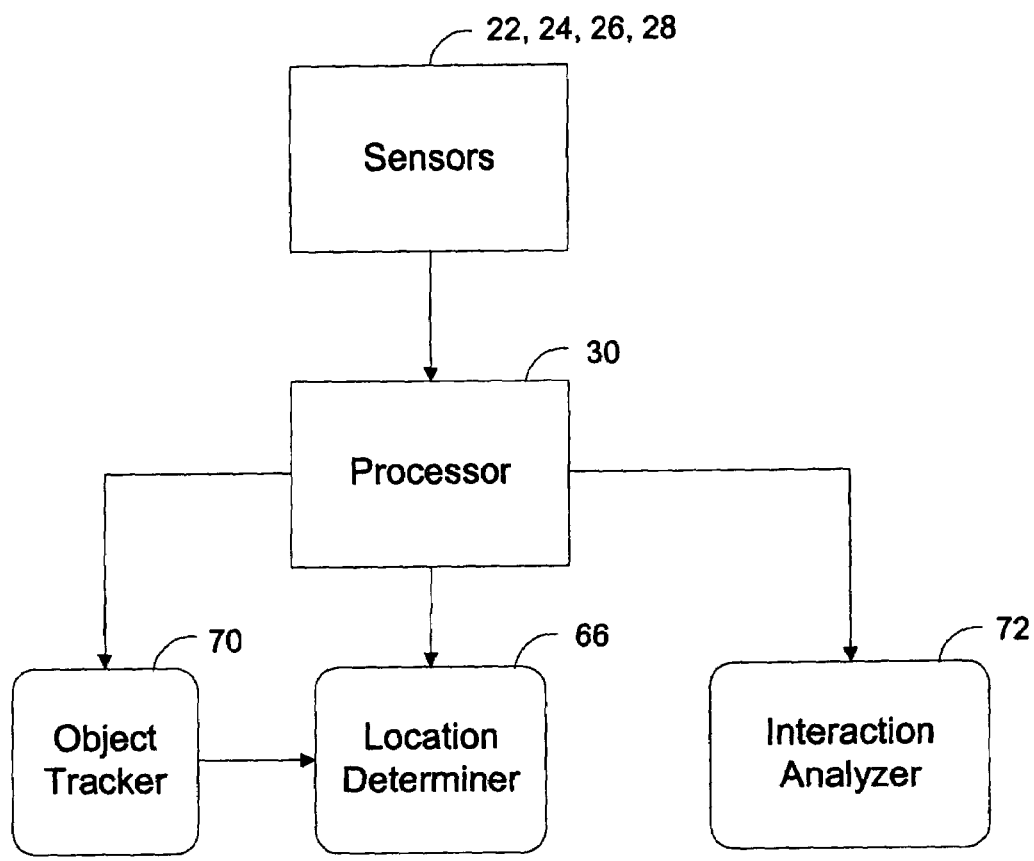
FIG. 5 is a block diagram of a load sensing system.

As FIG. 5 shows, software modules may interact with the processor 30. For example, a location determiner, which may be a location determiner software module 66, may be used to calculate the pressure on the surface 20, based on information from the sensors 22, 24, 26, 28. The location determiner 66 may include, for example, a Visual Basic program that reads periodically from the ADC 34 and calculates the center of pressure exerted by the object 42. The Visual Basic program also may be configured to visualize the result, as discussed in more detail with respect to FIG. 10.

Figure 6:
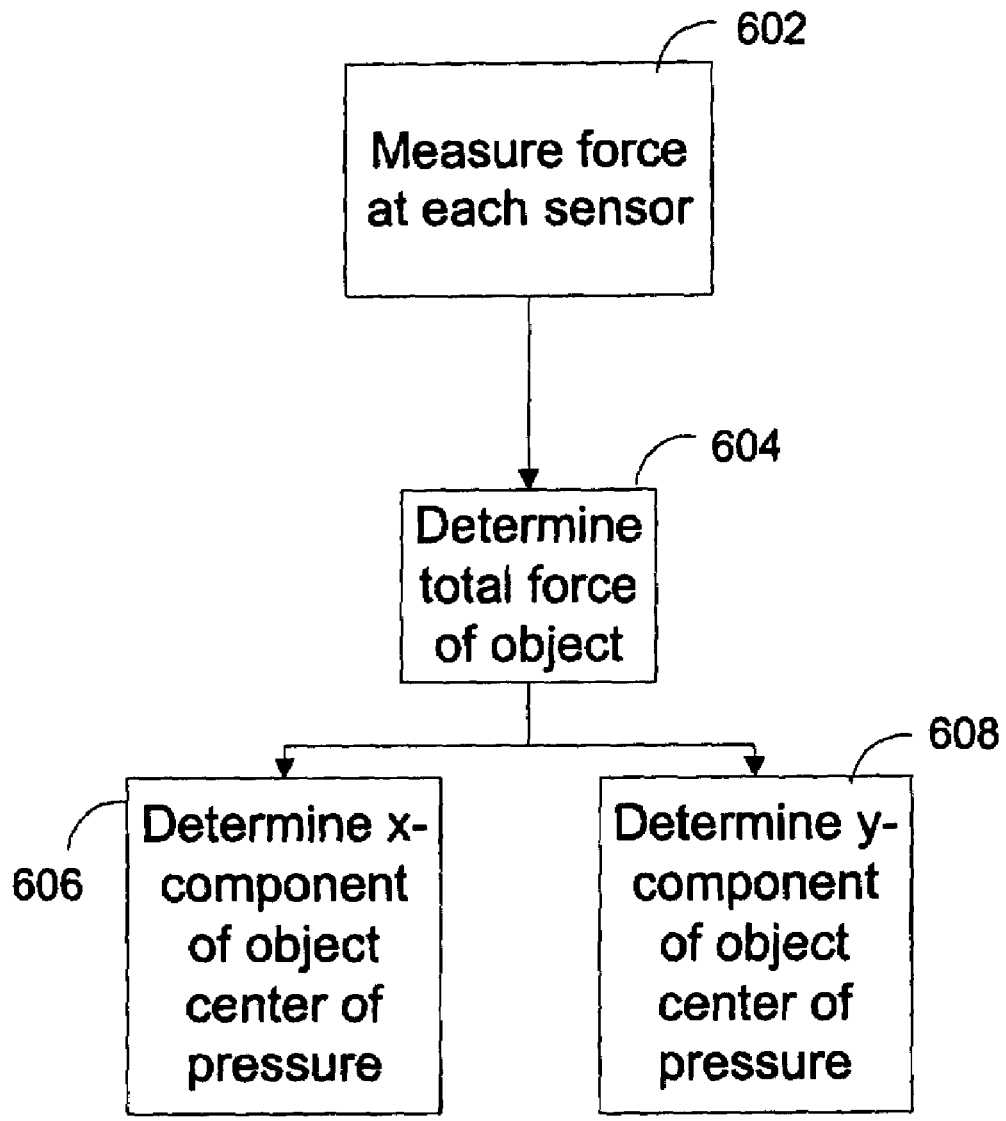
FIG. 6 is a flow chart of a method of determining object location.

FIG. 6 shows a method of determining the location of an object 42 using the location determiner 66. The pressure is measured at each of the sensors 22, 24, 26, 28 (602). The pressure at each sensor may be represented as $F_{22}$, $F_{24}$, $F_{26}$, and $F_{28}$. The location determiner 66 calculates the total pressure on the surface 20 (604) and determines directional components of the location of the object 42.

For example, the location determiner 66 may determine that a component of the location of the object 42 that is parallel to the edge of the surface that includes sensors 26 and 28 (the x-component) (606), as well as a component of the location perpendicular to the x-component and parallel to the edge of the surface including sensors 24 and 26 (the y-component) (608). The center of pressure of the object 42 is determined as the point on the surface identified by an x-coordinate and a y-coordinate of the location of the object.

For example, the position of sensor 22 may be represented by the coordinates (0, 0), the position of sensor 24 may be represented by the coordinates ($x_{max}$, 0), position of sensor 26 may be represented by the coordinates ($x_{max}$, $y_{max}$), and the position of sensor 28 may be represented by the coordinates (0, $y_{max}$), where $x_{max}$ and $y_{max}$ are the maximum values for the x and y coordinates (for example the length and width of the surface 20). The position of the center of pressure of the object 42 may be represented by the coordinates (x,y).

Figure 7:
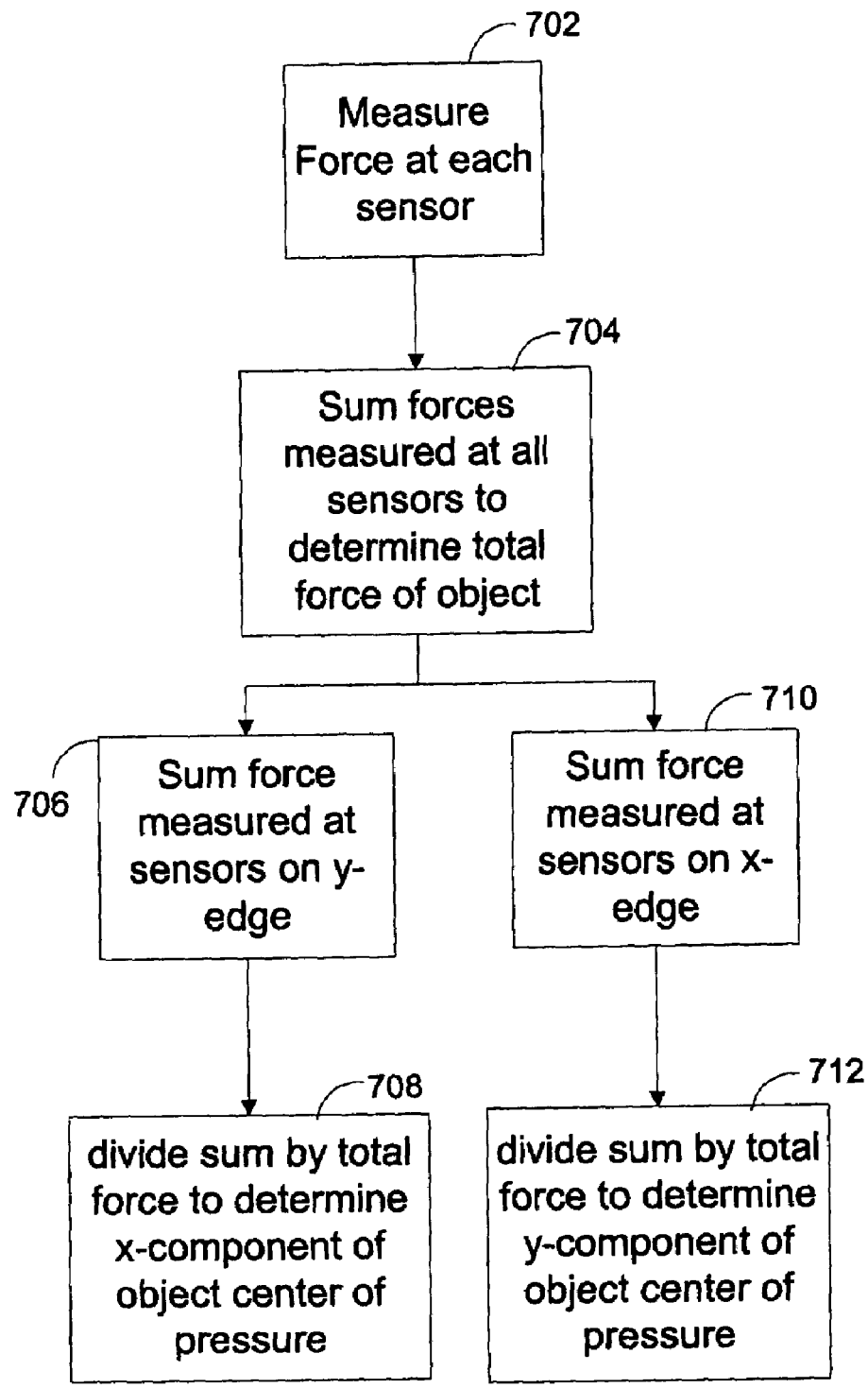
FIG. 7 is a flow chart of a method of determining object location.

FIG. 7 shows a more detailed method of determining the location of the object 42. Specifically, the total pressure on the surface ($F_x$) is computed by measuring pressure at each of the sensors 22, 24, 26, and 28 (702), and then summing the pressures measured at each of the sensors 22, 24, 26, 28 (704):

$$F_x = F_{22} + F_{24} + F_{26} + F_{28}$$

The x-coordinate (x) is determined by first summing the pressure measured at sensors located along an edge parallel to the y-component (for example, sensors 24 and 26) (706). The sum may then be divided by the total pressure on the surface to determine the x-coordinate of the center of pressure of the object (708):

$$x = x_{max} \frac{F_{24} + F_{26}}{F_x}$$

Likewise, the y-coordinate (y) of the center of pressure may be determined by first summing the pressure measured at sensors located along an edge parallel to the x-component (for example sensors 26 and 28) (710). The sum may then be divided by the total pressure on the surface to determine the y-coordinate of the center of pressure of the object (712):

$$y = y_{max} \frac{F_{26} + F_{28}}{F_x}$$

The surface 20 itself may exert a pressure, possibly unevenly, on the sensors 22, 24, 26, 28. Similarly, as FIG. 2 shows, a second object 68, already present on the surface 20, may exert a pressure, possibly unevenly, on the sensors. Nonetheless, the location determiner 66 may still calculate the location of the first object 42 by taking into account the distribution of pressure existing on the surface 20 (or contributed by the surface 20) prior to the placement of the first object 42 on the surface 20. For example, pre-load values at each of the sensors 22, 24, 26, 28 may be measured and the total pressure ($F0_x$) on the surface 20 prior to placement of the first object 42 may be determined by summing the pre-load values ($F0_{22}$, $F0_{24}$, $F0_{26}$, $F0_{28}$) at each of the sensors 22, 24, 26, 28:

$$F0_x = F0_{22} + F0_{24} + F0_{26} + F0_{28}$$

The x-coordinate of the center of pressure of the first object may be determined by subtracting out the contributions to the pressure made by the second object 68 (or by the surface 20 itself):

$$x = x_{max} \frac{(F_{24} - F0_{24}) + (F_{26} - F0_{26})}{(F_x - F0_x)}$$

The y-coordinate of the center of pressure of the first object may be determined similarly:

$$y = y_{max} \frac{(F_{26} - F0_{26}) + (F_{28} - F0_{28})}{(F_x - F0_x)}$$

An object tracker 70, shown in FIG. 5, processes information from the location determiner 66. Specifically, the object tracker 70 tracks the movement of the object 42 by determining its location at different points in time. The object tracker 70 may be, for example, a software module controlled by the processor 30. Alternatively, it may be a software module controlled by the PC 38 that interfaces with the processor 30. The object tracker 70 may store a history of the location of the object with respect to time, using information from the location determiner 66 and the memory 48.

In addition to position information, interactions or events between the object and the surface also may be determined. For example, the object 42 may be placed on the surface 20, or removed from the surface 20, or, if resting in an upright position on the surface 20, it may be knocked down. These interactions may be recognized and classified by analyzing the pressure information from the sensors 22, 24, 26, 28. In one implementation, each sensor may be an industrial load cell that may handle a maximum of 20N. The voltage signals from the sensors may be amplified using the amplifiers 40 to a generate signals in the range of 0 to 4.4V. An interaction analyzer 72, shown in FIG. 5, may process interaction information from the sensors 22, 24, 26, 28. The interaction analyzer 72 may include a software module controlled by the processor 30.

Figure 8:
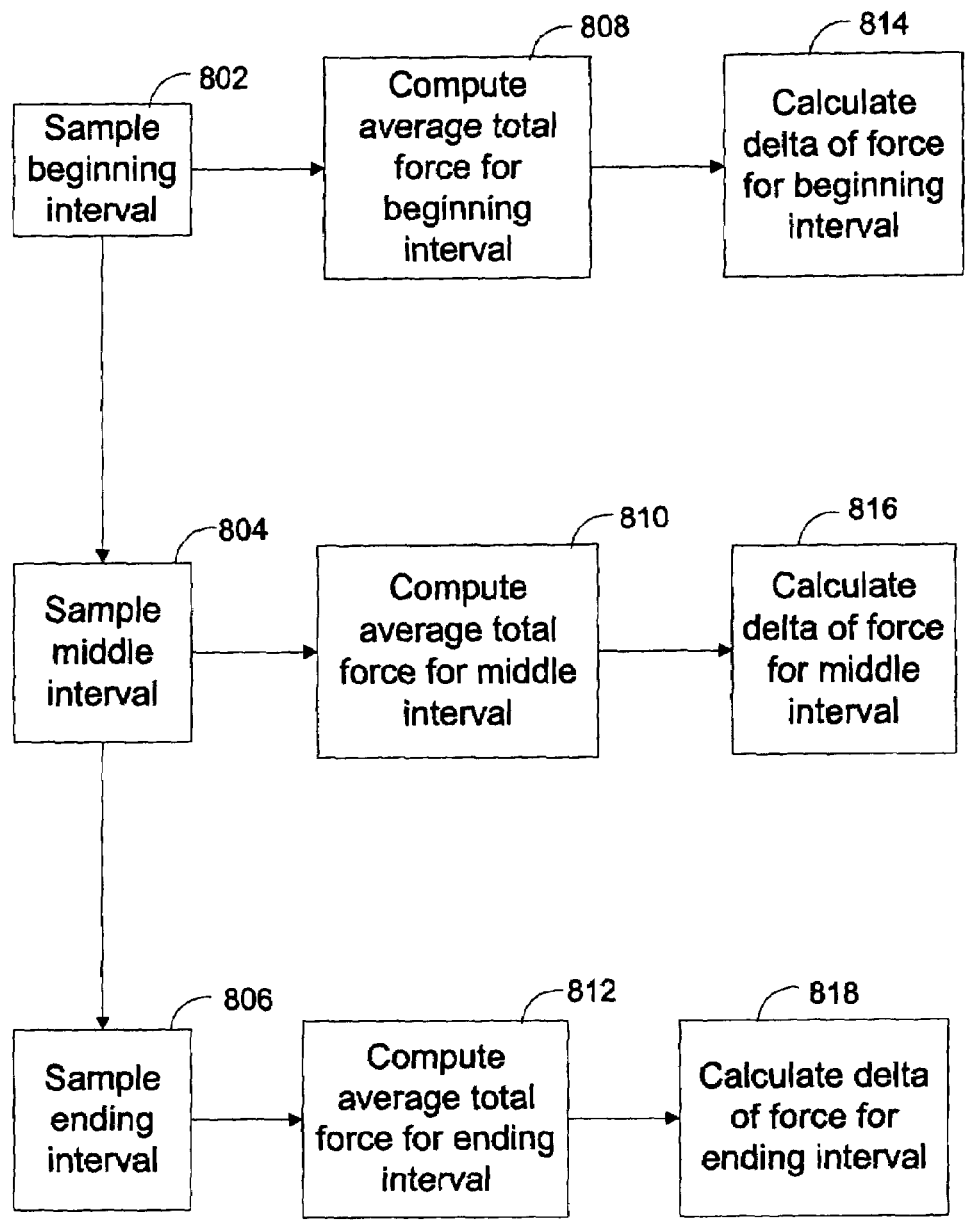
FIG. 8 is a flow chart of a method of determining interaction information.

FIG. 8 shows a method of determining interaction information using the interaction analyzer 72. The total pressure on the surface is sampled and measured during several intervals that are defined by an occurrence of an event. The total pressure on the surface may be sampled during a first interval before the event (802), during an intermediate interval (804), in which the event takes place, and during an ending interval (806), after the event has taken place. In one implementation, the intervals may be part of a sliding window of time that incrementally moves forward over time.

The sliding window may be, for example, a 500 ms sliding window, where a first window is a period of time from 0 ms to 500 ms, a second window is a period of time from 1 ms to 501 ms, and so on. The final 500 ms of the sliding window, for example, may be sampled at a frequency chosen to generate 125 sampling points. The starting interval may be the first 25 sampling points, the intermediate interval may be the next 75 sampling points, and the ending interval may be the final 25 sampling points.

The interaction analyzer 72 may compute characteristics of the load on the surface during each of the intervals. For example, the interaction analyzer 72 may compute the average total pressure on the surface 20 during each interval (steps 808, 810, 812). The interaction analyzer 72 may then compute a change value for each interval, representing how the total pressure on the surface 20 changes during each interval (steps 814, 816, 818). By comparing the characteristics of these intervals to each other, the interaction analyzer 72 may be operable to characterize the event.

The average total pressure on the surface during each interval may be computed as follows (808, 810, 812):

Average pressure during starting interval $$A_s = \frac{\sum_{j=(t-124)...(t-101)} F_x(j)}{25}$$

Average pressure during intermediate interval $$A_m = \frac{\sum_{j=(t-100)...(t-25)} F_x(j)}{75}$$

Average pressure during ending interval $$A_e = \frac{\sum_{j=(t-24)...(t)} F_x(j)}{25}$$

The change values for each interval may be computed as follows (814, 816, 818):

Starting interval change value $$D_s = \frac{\sum_{j=(t-124)...(t-101)} |F_x(j) - A_s|}{25}$$

Intermediate interval change value $$D_m = \frac{\sum_{j=(t-100)...(t-25)} |F_x(j) - A_m|}{75}$$

Ending interval change value $$D_e = \frac{\sum_{j=(t-24)...(t)} |F_x(j) - A_e|}{25}$$

Figure 9:
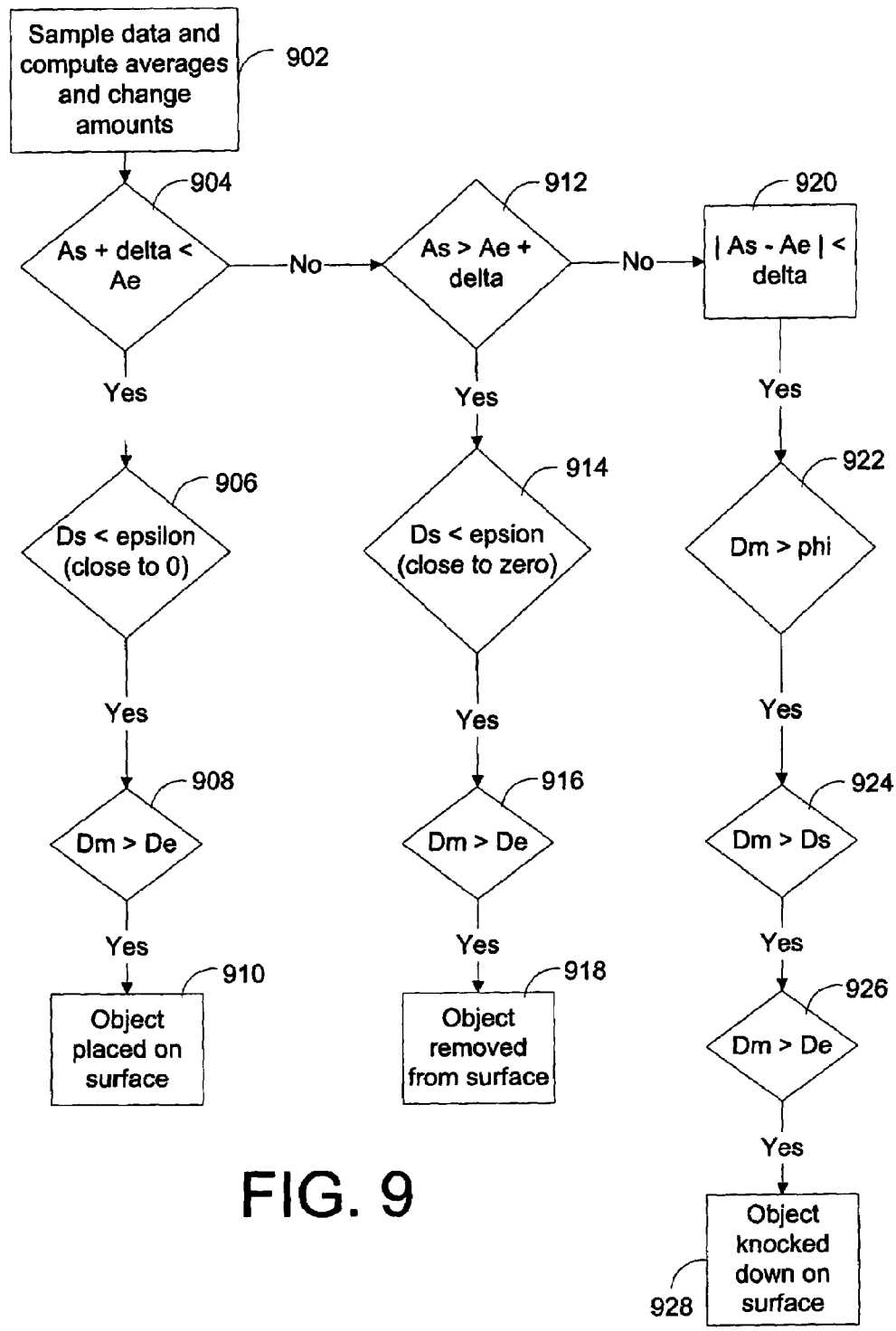
FIG. 9 is a flow chart of a method of determining interaction information.

FIG. 9 shows a method of characterizing an interaction or event. The average total pressure values and change values are computed as above (902). By examining the average total pressure and change values, the interaction analyzer 72 may characterize the event, for example as a placement of an object on the surface (steps 904, 906, 908, 910), a removal of an object from the surface (steps 912, 914, 916, 918), or as a knocking over of an object on the surface (steps 920, 922, 924, 926, 928).

An event that includes placing an object on the surface may be characterized by an increase in the average total pressure. For example, the average total pressure during the interval before the event ($A_s$) is less than the average total pressure during the interval after the event ($A_e$). The interaction analyzer may compare the starting and ending average total pressures by determining whether the average total ending pressure exceeds the average total starting pressure by a threshold value δ (904):

$$A_s + \delta < A_e$$

The threshold value δ may be chosen based on properties of the system components chosen, for example properties of the sensors 22, 24, 26, 28 (e.g. the maximum pressure and the sensor resolution) and the ADC 34 (e.g. the ADC resolution).

The interaction analyzer module 72 determines that the average total pressure on the surface before the event was stable, by determining that the change value $D_s$ is close to zero (906). The interaction module 72 may compare $D_s$ to a small threshold value ε and determine that $D_s < ε$. The threshold value ε may be chosen based on properties of the system components. The interaction analyzer module 72 also may determine that the change in average total pressure is greater during the interval when an object is placed on the surface than in the ending interval, when the total pressure has stabilized ($D_m > D_e$) (908). Thus the interaction analyzer module 72 may determine that an object has been placed on the surface 20 if the average total pressure on the surface 20 was stable in the starting interval, experienced a change in the intermediate interval, and stabilized at a higher average total pressure in the ending interval.

Similarly, the interaction analyzer 72 may determine that an object has been removed from the surface. In the case of an object removal event, the average total pressure during the ending interval is determined to be less than during the starting interval ($A_s > A_e + \delta$) (912); the average total pressure is determined to be stable in the starting interval ($D_s < \epsilon$) (914); and the average total pressure experiences a change in the intermediate interval and stabilizes in the ending interval ($D_m > D_e$) (916).

The interaction analyzer 72 also may determine that an object has been knocked over on the surface. Specifically, the interaction analyzer 72 may determine that the average total pressure does not change, since an object has not been added or removed from the surface ($|A_s - A_e| < \delta$) (920); and that there is a large change value during the intermediate interval. The interaction analyzer 72 may determine that the change value during the intermediate interval is greater than a threshold value $\Phi$ ($D_m > \Phi$) (922), and that the change value during the intermediate interval is greater than the change value at either the starting or ending intervals ($D_m > D_s$, $D_m > D_e$) (steps 924, 926). The threshold value $\Phi$ may be chosen based on properties of the system components, so as to avoid registering incidental or background measurements that do not correspond to actual object movement(s).

Figure 10:
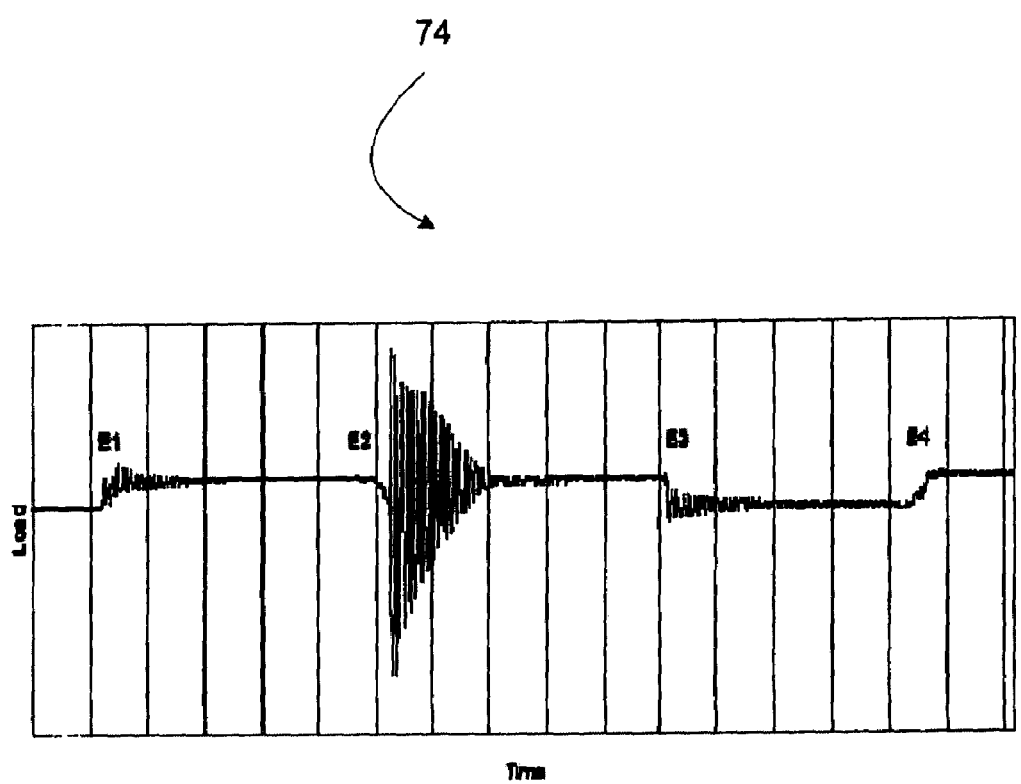
FIG. 10 is a graph of interaction information with respect to time.

A visualization, for example FIG. 10, may be created by the PC 38 to display events, perhaps using the location determiner 66 of FIG. 5. The visualization includes a graph 74 comparing the force measured with respect to time. For example, the graph 74 shows that an object is placed on the surface at time E1, an object is knocked over on the surface at time E2, an object is removed from the surface at time E3, and an object is added to the surface at time E4. The PC 38 also may create text messages, sounds, or voice messages that describe events on the surface 20.

Contextual information such as position and interaction information may be used to characterize the behavior of a human in an environment. For example, as shown in FIG. 11, the environment may be a room 76, and the surface 20 may be the floor of the room 76, on which chairs 78, 80 and a coffee table 82 are placed. The floor surface 20 may be implemented as a position and interaction sensing floor. For example, the floor 20 may be a wooden surface resting on four load cells 22, 24, 26, 28 (as shown in FIGS. 2 and 3). The load cells are positioned under the four corners of the surface 20. The load cells may be chosen based on the anticipated weight that will be applied to the surface. For example, S-load cells, each with a capacity of 1000N, may be chosen if a total load of 280 kg is anticipated. As described above, the load cells may be connected to the processor 30, which may be connected to the PC 38.

The force, and the location of the force, applied to the floor 20 by the stationary objects (chairs 78, 80 and table 82) may be measured and stored as the pre-load values $F0_1$, $F0_2$, $F0_3$, $F0_4$, when the force applied to the floor 20 is determined to be stable. The interaction analyzer 72 may determine that the floor 20 is stable when the change value of the average pressure applied to the floor 20 is less than a threshold value. For example, when the $D_s$, $D_m$, and $D_e$ values are close to zero for more than 5 seconds, the pressure applied to the floor may be considered stable, and the pre-load values may be stored.

When a person 84 enters the room (represented on FIG. 11 by a series of linked circles), she exerts a pressure on the floor 20. The location determiner 66 calculates the center of pressure of the person 84, in terms of x and y coordinates, taking into account the pre-load values measured by the sensors 22, 24, 26, 28. As the person 84 walks about the room, changing location, the location determiner 66 periodically recalculates the center of pressure of the person 84. The interaction analyzer 72 may determine that the person 84 is changing position when one of the $D_s$, $D_m$, and $D_e$ values are above a threshold.

The object tracker 70 tracks the position of the person 84 with information from the location determiner 66. Additionally, the location determiner 66 may compare the location of the person 84 to other objects in the room. For example, if the person 84 sits in chair 78, the location of the person's center of pressure will be the same as the location stored for the chair 78. Entry or exit from the room may be similarly identified. The location of the person with respect to time may be stored and analyzed. For example, the total distance the person 84 traveled during a period time may be determined, or the overall activity in the room may be estimated.

Other surfaces, for example the coffee table 82, also may be configured to sense location and interaction information. As described above, the coffee table may be equipped with sensors that may be chosen based on the anticipated force that will be applied to the surface. For example, the coffee table 82 may be configured to measure a maximum load of 8 kg, which is appropriate for measuring items such as newspapers, magazines, and cups, which would normally be put on a coffee table. Similarly, a dining room table may be configured with sensors that measure a maximum capacity of 500N each, resulting in an overall capacity of 200 kg. Further examples of surfaces that may be configured to sense location and interaction information include shelves and boards that may hang on a wall.

Figure 12:
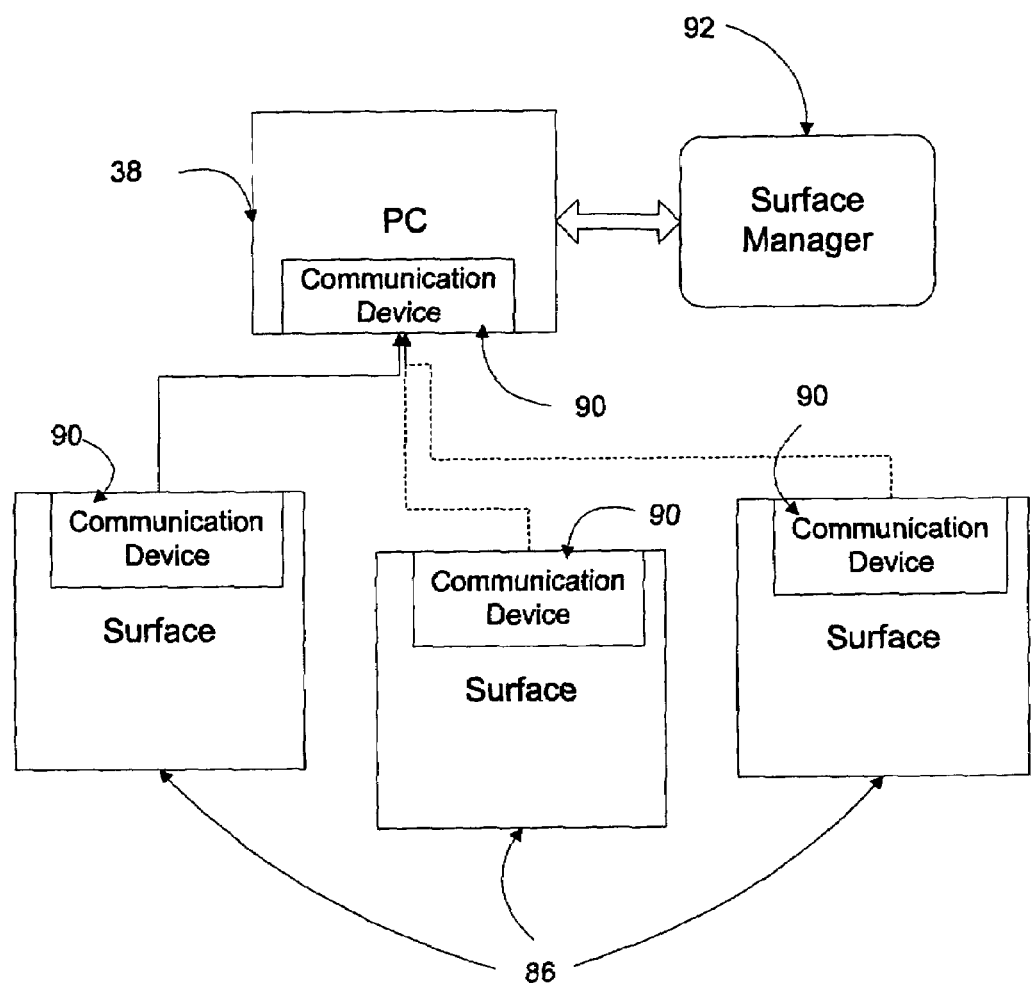
FIG. 12 is a diagram of a system for processing information from multiple load sensing surfaces.

More than one surface may be used simultaneously to sense location and interaction information. FIG. 12 shows multiple surfaces, each including sensors and a processor, interfacing with the PC 38. The surfaces may interface with the PC 38 using, for example, RS-232 or RF transceiver technology 90. A surface manager 92, such as a software module controlled by the PC 38, analyzes position and interaction information from the surfaces 86. The surface manager may identify the source surface for information received based on surface identifiers 60 included in the data packets 54 sent by the surfaces 86. Position and event information is also included in the data packets. In one implementation, the surface manager 92 may analyze the information from the multiple surfaces 86 and generate a response. For example, a person may be alerted that they have left an item behind in a room. As shown in FIG. 11, the surfaces may include the floor 20 and the coffee table 82. The person 84, carrying for example a book, may be tracked as she walks across the room 76 on the floor surface 20. Position and interaction information are sent by the floor surface 20 to the surface manager 92. When she sets the book on the coffee table 82, the coffee table 82 detects the event of placing the book on the table, and sends this position and interaction information to the surface manager 92. When the person 84 begins to exit the room 76, the surface manager 92 may interpret information from both surfaces 20, 82 (i.e. the coffee table surface 82 still senses the presence of the book, and the floor surface 20 senses the reduction in pressure indicating the absence of the person 84) and determine that the book has been left behind. The surface manager 92 may then trigger an alert, such as the sounding of an alarm, or an announcement of a message. It is also possible to record and compare the weight of the person 84 as she enters the room to the weight of the person 84 as she leaves the room to determine if an object has been left behind.

The position and interactions of a person or persons with load sensing surfaces may be tracked for long periods of time to determine patterns. For example, activities such as drinking coffee, having lunch, reading the newspaper, or working, may be studied by tracking the person's relationship to the surface. The surfaces in a room, such as the floor 20 and coffee table 82 of FIG. 11, collect and send positional and interaction information to the PC 38, where it is stored and analyzed.

A number of implementations have been described. Nevertheless, it will be understood that various modifications may be made. Accordingly, other implementations are within the scope of the following claims.

What is claimed is:

1. A method comprising:
    sensing force information at a plurality of points on a substantially continuous surface, the force information related to an object on the surface;
    calculating a distribution of force exerted by the object, relative to the surface, based on the force information; and
    determining a location of the object on the surface, based on the distribution of force,
    wherein computing a center of force comprises:
        computing a total force applied to the surface by the object;
        computing the center of force of the object on the surface;
        determining a first component of the center of force by computing a first quotient of a first sum and a total force applied to the surface by the object, the first sum obtained by summing a first force applied at a first point and a second force applied at a second point; and
        determining a second component of the center of pressure, perpendicular to the first component, by computing a second quotient of a second sum and the total force, the second sum being obtained by summing the first force applied at the first point and a third force applied at a third point.

2. The method of claim 1 comprising:
    sensing a variation in the force information; and
    detecting a change in the location of the object, relative to the surface, based on the variation in the force information.

3. The method of claim 1 comprising:
    computing the first and second components of the center of force of the object at a first period of time;
    computing the first and second components of the center of force of the object at a second period of time; and
    detecting a new location of the object on the surface, based on a change in the first and second components from the first period to the second period.

4. The method of claim 1 comprising:
    sensing the force information at a later period of time; and
    detecting a second location of a second object on the surface based on the force information.

5. The method of claim 4 comprising:
    identifying the object as a person; and
    tracking the position of the person.

6. The method of claim 4 comprising:
    identifying the first and second objects as people; and
    tracking a center of activity of the people.

7. The method of claim 1 in which sensing force information includes measuring a voltage level at a plurality of load cells, each of the load cells corresponding to each of the plurality of points.

8. The method of claim 7 comprising compensating for the force applied by the surface to the load cells.

9. A method comprising:
    sampling force information at points on a continuous surface during a plurality of time intervals;
    identifying an interaction between an object and the surface based on the sampled information;
    computing an average force on the surface during each of the time intervals;
    comparing a first average weight during a starting interval to a second average weight during an ending interval;
    determining that a first variability during the starting interval meets or exceeds a variability threshold value;
    comparing a second variability during the ending interval to a third variability during an intermediate interval, between the starting and ending intervals; and
    identifying a change in a number of objects on the surface, based on the first and second average weights, and the first second, and third variabilities.

10. The method of claim 9 comprising computing a variability in the force on the surface during each of the time intervals.

11. The method of claim 9 comprising comparing a difference between the first average weight and the second average weight to an average weight threshold.

12. The method of claim 9 comprising:
    determining that a difference between the first and second average weights meets or exceeds an average weight threshold;
    determining that the third variability meets or exceeds a variability threshold value;
    comparing the third variability to the first and second variabilities; and
    identifying a change in object position.

13. A method comprising:
    sensing force information at a plurality of points on a substantially continuous surface, the force information related to an object on the surface;
    calculating a distribution of force exerted by the object, relative to the surface, based on the force information;
    determining a location of the object on the surface, based on the distribution of force;
    sensing the force information at a later period of time; and
    detecting a second location of a second object on the surface based on the force information,
    wherein computing a center of force comprises:
        determining a first component of the center of force by computing a first quotient of a first sum and a total force applied to the surface by the object, the first sum obtained by summing a first force applied at a first point and a second force applied at a second point; and
        determining a second component of the center of pressure, perpendicular to the first component, by computing a second quotient of a second sum and the total force, the second sum being obtained by summing the first force applied at the first point and a third force applied at a third point.

14. A method comprising:
    sensing force information at a plurality of points on a substantially continuous surface, the force information related to an object on the surface;
    calculating a distribution of force exerted by the object, relative to the surface, based on the force information;

determining a location of the object on the surface, based on the distribution of force;

sensing the force information at a later period of time;

detecting a second location of a second object on the surface based on the force information;

identifying the object as a person;

tracking the position of the person;

identifying the second object as a possession of the person;

detecting an absence of the person on the surface; and alerting the person that the second object has been left behind.

* * * * *